H. F. RODEMEYER & C. R. MARTIN.
HAY LOADER.
APPLICATION FILED JUNE 8, 1915.
1,287,593.
Patented Dec. 10, 1918.
4 SHEETS—SHEET 1.
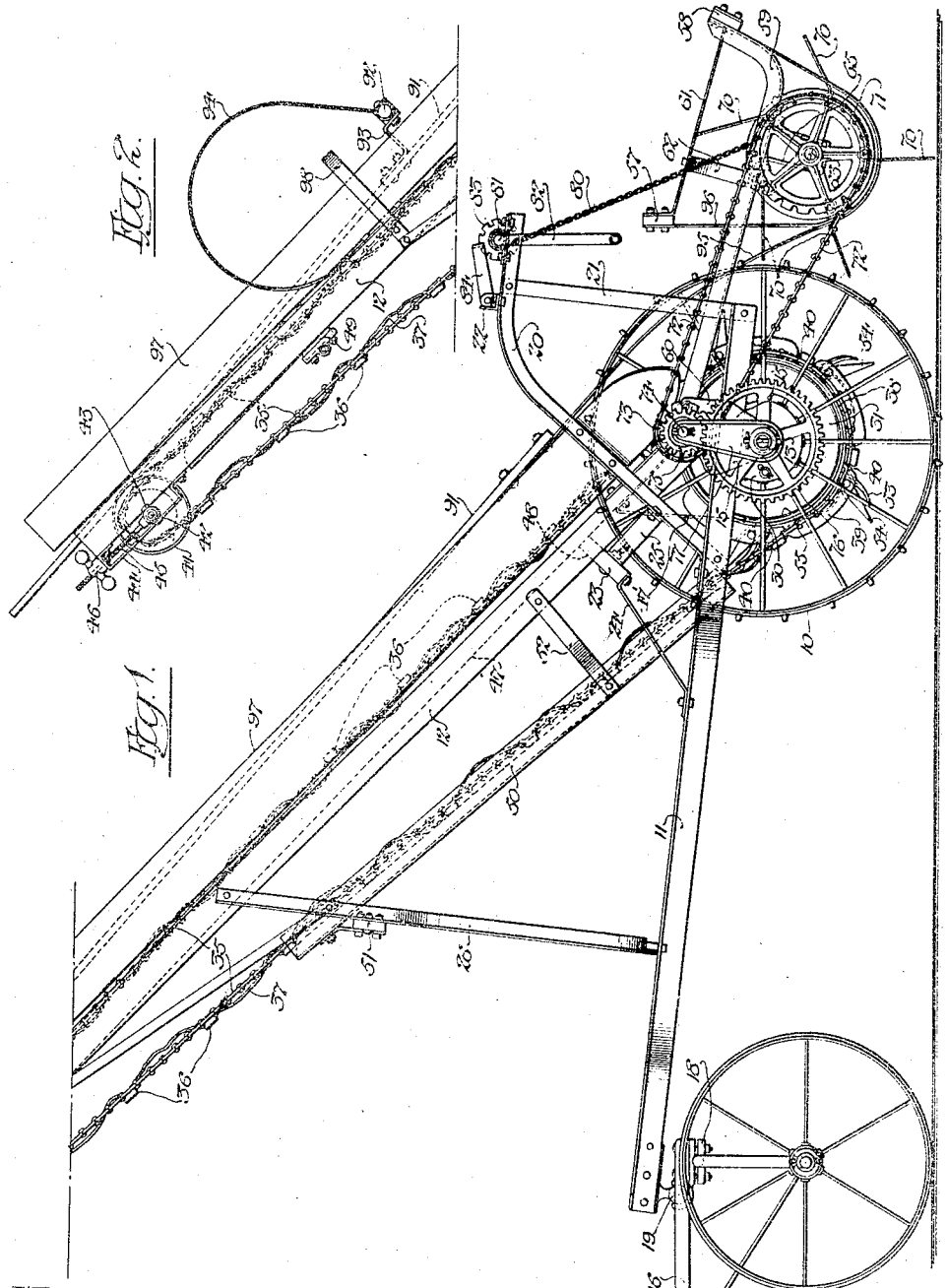

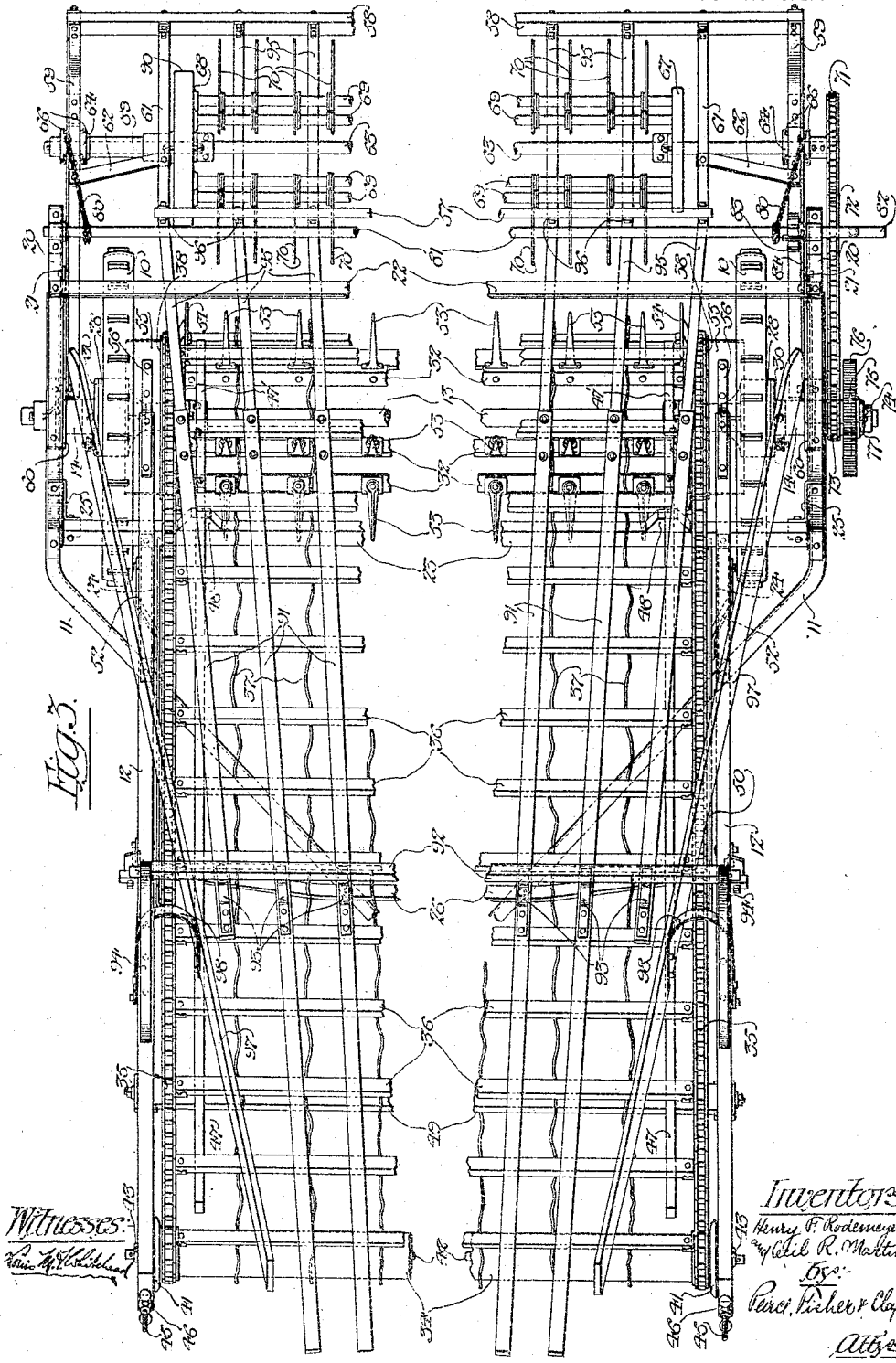

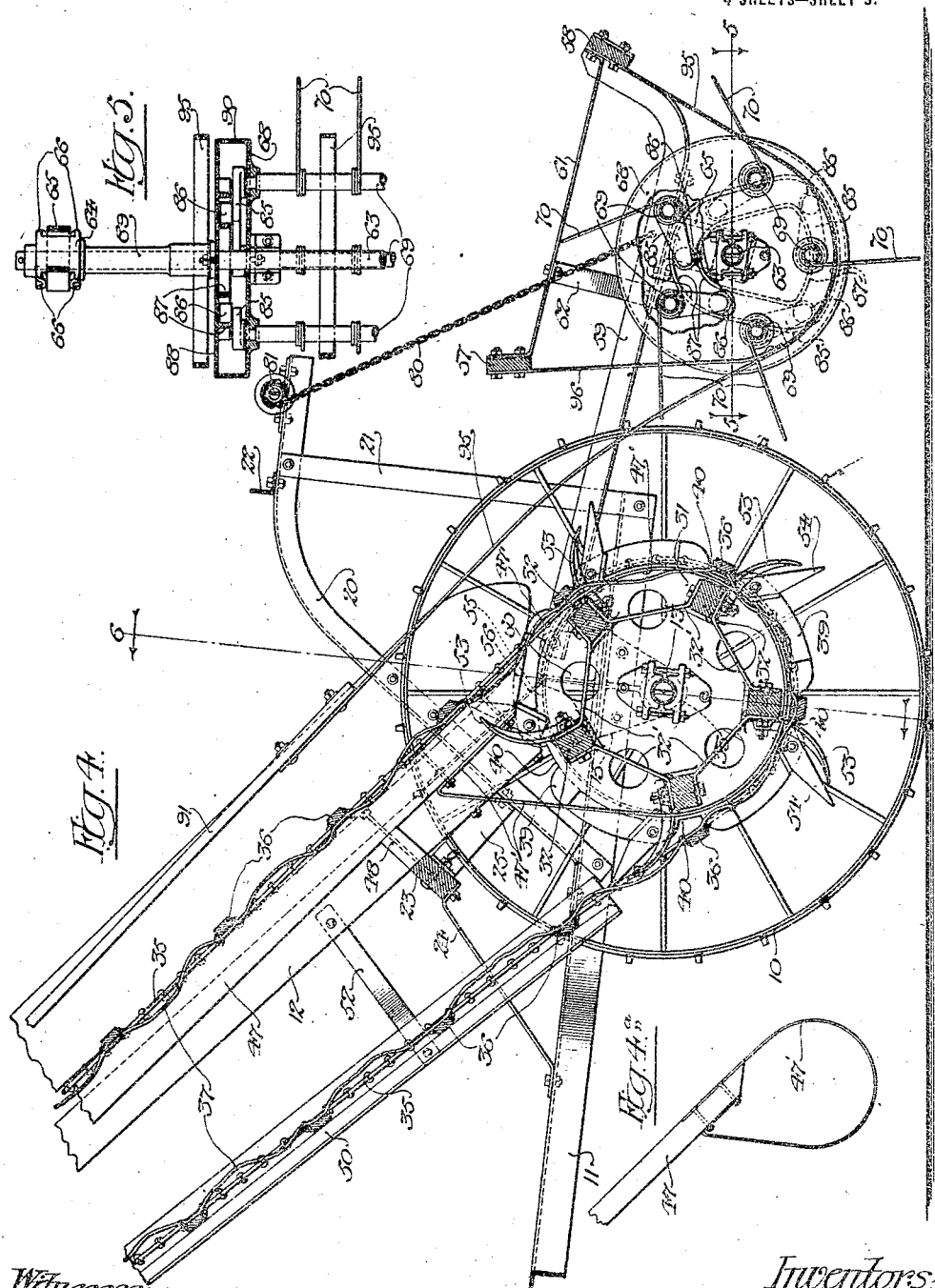

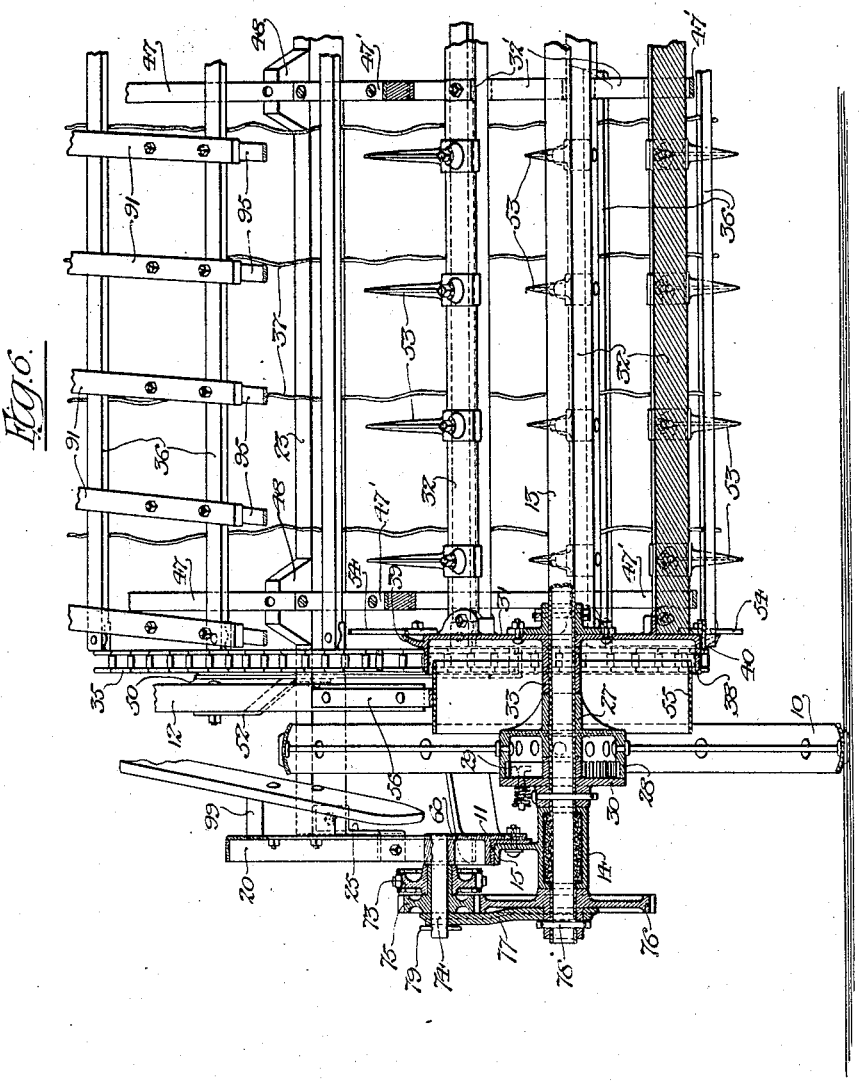

UNITED STATES PATENT OFFICE.

HENRY F. RODEMEYER AND CECIL R. MARTIN, OF STERLING, ILLINOIS, ASSIGNORS TO STERLING MANUFACTURING COMPANY, OF ROCK FALLS, ILLINOIS, A CORPORATION.

HAY-LOADER.

1,287,593.     Specification of Letters Patent.     Patented Dec. 10, 1918.

Application filed June 8, 1915. Serial No. 32,816.

*To all whom it may concern:*

Be it known that we, HENRY F. RODEMEYER and CECIL R. MARTIN, citizens of the United States, and residents of Sterling, county of Whiteside, and State of Illinois, have invented certain new and useful Improvements in Hay-Loaders, of which the following is a full, clear, and exact description.

The invention relates to hay loaders of that type designed to be drawn over the ground to gather the hay therefrom and deliver it into a vehicle to which the loader is attached. The invention seeks to provide an improved efficient hay loader of this type, and consists in the features of improvement hereinafter set forth, illustrated in the preferred form in the accompanying drawings and more particularly pointed out in the appended claims.

Figure 1 is a view in side elevation of the improved hay loader, the upper part of the elevator being broken away. Fig. 2 is a side elevation of the upper portion of the elevator. Fig. 3 is a plan view, the central portions being broken away. Fig. 4 is a longitudinal section taken through the lower portion of the elevator and through the gathering cylinder, a portion of one of the heads of the gathering cylinder being broken away. Fig. 4ª is a detail view of one of the carrier guides. Fig. 5 is a detailed section on the line 5—5 of Fig. 4. Fig. 6 is a detailed section on the line 6—6 of Fig. 4.

The machine is carried at its rear end upon wheels 10 and is adapted to be connected at its forward end to the vehicle upon which the hay is loaded. The main frame of the machine comprises horizontal side bars or sills and upwardly and forwardly inclined side bars 12. The side bars or sills 11 are preferably formed of angle bars and the rear parallel portions thereof are arranged outside of the ground wheels 10, as most clearly shown in Figs. 3 and 6. The ground wheels are mounted upon an axle 13 which is preferably hollow, as shown. The ends of the axle project beyond the hubs of the wheels and are journaled in bearings 14. The bearings 14 are provided with upwardly projecting lugs 15 (see Fig. 6) which are securely bolted to the side bars or sills 11. In front of the ground wheels, the side bars 11 converge forwardly and inwardly and their forward ends are connected to a draft bar 16 (see Fig. 1) which is provided with a coupling device 17 by which it may be attached to the vehicle. Preferably, as shown, the forward end of the loader frame is upheld by a small wheeled truck 18 which carries the draft bar 16 and to which the forward ends of the side bars 11 are connected by a ball-and-socket joint 19.

Angle bars 20 are secured to the side bars or sill 11 in front of the main axle 13 and extend upwardly and rearwardly therefrom. The upper horizontal portions of these bars are connected to the rear ends of the side sills by vertical bars 21 and are connected together by the transverse angle bar 22. The lower ends of the inclined side bars 12 are fixed to and supported upon a transverse bar 23 and the latter is supported at its ends by inclined brace bars 24 and 25 which extend respectively from the side sills 11 and from the inclined angle bars 20. The side bars 12 are also supported by a U-shaped brace 26 which extends upwardly from the front end portions of the side sills.

The hubs 27 of the ground wheels are loosely journaled on the axle 13, but the axle is connected to rotate with the ground wheels as the machine travels forwardly. For this purpose, the hub of each ground wheel is provided with an internally toothed flange 28 (see Fig. 6) which is arranged to be engaged by a spring-held pawl 29 mounted on a disk 30 that is fixed to the axle or shaft 13.

An elevating cylinder is mounted on the axle 13 between the hubs of the ground wheels 10. This elevating cylinder comprises heads 31 connected by a circular series of transverse bars 32. The central portions of the bars 32 are connected by bracing straps 32' (see Fig. 4). The heads 31 are fixed to the axle 13 and are provided with hub portions 33 which abut against the hubs 27 of the ground wheels. An endless elevating carrier passes around the elevating cylinder and around a guiding cylinder 34 (see Fig. 3) at the upper end of the machine frame. As usual, this elevating carrier comprises side chains 35 connected by cross slats 36, the slats being preferably connected by longitudinal ropes 37. Each head 31 of the elevating cylinder is provided with an outwardly projecting circular flange 38 over which the carrier chains 35 pass. Each head also has a radial flange 39 provided with notches or seats 40 for receiving the carrier slats 36, and by means of which the elevating carrier is driven. The guiding drum or cylinder 34 at the upper end of the machine is provided at its ends with guide flanges 41 and is mounted upon a shaft 42. The ends of the shaft extend beneath the inclined side bars 12 (see Fig. 2) and are journaled in bearings 43. The latter are adjustably held in position between the bars 12 and short U-shaped supporting straps 44. Adjusting screws 45 connected to the bearings 43 extend through the ends of the straps 44 and are provided with hand-nuts 46. By this means, the endless elevating carrier may be placed under proper tension.

The cross slats 36 on the upper reach of the carrier pass over a series of longitudinal guiding runner bars 47 which extend between the elevating cylinder and the guiding drum 34. These bars are fixed at their lower ends to upwardly projecting parts 48 on the supporting cross bar 23. At their upper ends, the carrier guide bars 47 are fixed to a cross bar 49 (see Figs. 2 and 3) which is secured at its ends to the inclined side bars 12. Loop-shaped guiding straps 47' are fixed to the lower ends of the guide bars or runners 47 and extend about the elevating cylinder and closely adjacent the cylinder bars 32. The ends of these straps are fixed to the upper and lower edges of the runners, as shown in Fig. 4ª, and serve to support and guide the carrier slats 36 as they pass from the elevating cylinder onto the runner bars 47.

Inclined guides 50 (see Fig. 1) are provided for the lower reach of the carrier. These guides are fixed at their upper ends to a cross bar 51 on the U-brace 26 and, at their lower ends, are supported by braces 52 that extend downwardly and forwardly from the inclined side bars 12. The guides 50 engage the carrier chains 35 and direct the same onto the flanges 38 of the elevating cylinder heads.

The transverse bars of the elevating cylinder are each provided with a series or row of rigid teeth 53 which are preferably fixed to the rear faces of the bars and are curved rearwardly with reference to the direction of rotation, as most clearly shown in Fig. 4. The cross bars 32 are arranged in alinement with the notches 40 that receive the carrier slats 36, so that the edges of the teeth 53 that project through the carrier are arranged closely adjacent the slats. These curved teeth are so shaped that, as they are withdrawn from the hay on the carrier, the forward edges thereof will be maintained closely adjacent the carrier slats 36. Thus the carrier slats serve to cleanly strip the hay from the teeth of the elevating cylinder. It should be noted that the carrier slats are supported at this stripping position by the guiding bars and straps 47 and 47'. Preferably, also, the heads 31 of the elevating cylinder are provided with teeth 54 which are fixed to the flange portions 39 just in the rear of the notches 40 therein. These teeth, like the teeth 53, are inclined rearwardly, so that they will not strike the slats 36 as they pass through the carrier and are withdrawn therefrom. These teeth are preferably longer than the teeth 53, to thereby more effectively assist in elevating the hay at the sides of the machine.

It should be noted that the side bars or sills 11 of the frame are entirely outside the support wheels 10 and they do not in any way interfere with or retard the upward movement of the hay at the sides of the elevating cylinder and carrier. To prevent the hay from working into the spaces between the ends of the elevating cylinder and wheels, a pair of cylindrical guarding drums 55 are interposed in these spaces (see Figs. 3 and 6). These guarding drums are formed of thin sheet metal and are held in place by straps 56 fixed thereto and to the lower ends of the inclined side bars 12. The drums as shown are slightly smaller than and project within the flanges 38 of the heads 31 and also extend closely adjacent the spokes of the wheels 10 and thus effectively prevent the hay from working into the spaces between the wheels and elevating cylinder and winding about the axle.

It should be noted that the inclined side bars 12 of the carrier frame do not project rearwardly of the wheel axle and are supported at their lower ends entirely by a cross bar 23 located in front of the wheels. Thus, the spaces between the wheels and the ends of the gathering cylinder are unobstructed by straight frame members that would interfere with the upward movement of the hay over the elevating cylinder and carrier. Moreover, the wheels are located closely adjacent the ends of the elevating cylinder and, since they travel in the same direction, the portions of the wheels that project beyond the cylinder guarding drums 55 assist the upward movement of the hay instead of retarding it as would fixed frame members. The spaces between the ends of the cylinder and the central portions of the wheels are practically filled up by the cylindrical guarding drums to prevent the hay from winding about the wheel hubs and axle but these drums do not project beyond the periphery of the cylinder and are preferably slightly smaller so that they do not in any way interfere with the upward movement of the hay.

A gathering cylinder is mounted in the rear of the elevating cylinder upon a vertically movable frame. This frame comprises front and rear transverse bars 57 and 58 and side bars 59. The side bars 59 are provided with up-turned rear ends which are fixed to the rear transverse bar 58 and the forward ends of these bars are pivoted to brackets or castings 60 fixed to the side bars or sills 11 of the main frame (see Figs. 3 and 6). These brackets are arranged above the main axle 13 and project upwardly from the sills or side bars 11, as most clearly shown in Fig. 6. The front transverse bar 57 of the gathering cylinder frame is connected to the rear bar 58 by a pair of longitudinally extending end straps 61 and a pair of upwardly and inwardly inclined braces 62 extend between the frame bars 59 and the straps 61, as shown in Figs. 1 and 3.

The gathering cylinder is mounted upon a shaft 63 which is journaled at its ends in boxes 64. These boxes are mounted in a pair of U-shaped guides 65 which are fixed to the frame bars 59 and depend therefrom. The boxes 64 are provided with lugs 66 (see Fig. 3) which overlap the edges of the guides 65 and prevent the disengagement of the boxes therefrom. But the boxes are free to move vertically in the guides 65 so that the shaft 63 and gathering cylinder carried thereby are free to rise and fall as the machine passes over the ground.

The gathering cylinder comprises heads 67 and 68, which are fixed to the shaft 63 and a circular series of bars 69 provided with spring teeth 70. At one side of the machine, shaft 63 is provided with a sprocket 71 and a drive chain 72 passes over this sprocket and over a smaller sprocket 73 mounted on a short shaft 74. The shaft 74 is fixed at its inner end to one of the brackets 60 (see Fig. 6) and carries a small gear 75 that is fixed to the sprocket wheel 73. Gear 75 meshes with the teeth of a large gear 76 which is fixed to the adjacent projecting end of the wheel axle 13. A bar 77 fits loosely over the hub of the gear 76 and over the outer end of the shaft 74 and is held in place by pins 78 and 79 extended through these parts. This bar supports the outer end of the short shaft 74.

Shaft 74 is located closely in line with the pivot of the frame bars 59, so that the latter and the gathering cylinder supported thereby can rise and fall without disturbing the driving connection for the gathering cylinder. The gathering cylinder frame is held in the desired position with respect to the ground by a pair of supporting chains 80 which extend from the rear ends of the bars 59 to a transverse windlass shaft 81. This shaft is journaled in suitable bearings upon the upper horizontal portions of the bars 20 and is provided at one end with a crank handle 82 by which it may be turned to raise and lower the cylinder frame. The windlass shaft is also provided adjacent the handle 82 with a ratchet 83 which is arranged to be engaged by a dog 84 pivoted on the bar 22 to thereby hold the windlass shaft and the gathering cylinder frame in the desired adjusted position. The flexible chains 80 of course so support the gathering cylinder frame that the latter can rise in passing over the irregularities in the ground. Furthermore, as described, the shaft of the gathering cylinder is so mounted that the cylinder can rise and fall independently of its supporting frame, and one end of the cylinder can rise and fall independently of its opposite end, to effectively gather up the hay as the machine passes over irregularities in the surface of the ground.

The tooth-supporting bars 69 of the gathering rake or cylinder are journaled in the heads 67 and 68. Within the head 68 these bars are provided with crank arms 85 having pins or rollers 86 thereon which engage a cam groove formed by flanges 87 on a disk 88. This disk is fixed to the inner end of a sleeve 89 and the latter is fixed at its outer end to the adjacent journal box 64. The disk 88 is thus held against rotation and the cam groove therein serves to rock the bars 68 and the teeth thereon so that the latter are substantially vertical and radial as they pass forward over the ground and are substantially horizontal or tangential as they are withdrawn from the hay. As shown in Fig. 5, the cylinder head 68 is provided with an outwardly projecting flange 90 which coöperates with the disks 88 to form an inclosing casing for the crank arms 85.

As the hay is moved upwardly by the elevating carrier, it is held in place thereon by a series of compressor bars 91. These bars, as shown in Fig. 3, converge from the lower to the upper end of the carrier frame. Near the upper end of the carrier the compressor bars are connected to a transverse supporting bar 92 by a series of straps 93. Bar 92 is provided with rounded end portions which are engaged by round eyes on a pair of C-shaped springs 94 which extend upwardly and forwardly therefrom and which are fixed at their opposite ends to the inclined side bars 12. The lower ends of the compressor bars are connected to straps or bars 95 of spring steel which extend downwardly over the elevating cylinder and beneath the gathering cylinder and thence extend upwardly to the transverse bar 58 to which they are secured. Brace bars 96 extend downwardly from the cross bar 57 and are connected to the bars 95. The bars 95 serve as spring supports for the lower ends of the compressor bars 91 and are also arranged to act as strippers for the teeth of the gathering cylinder. They also act as extensions of the compressor bars and serve to hold the hay in position upon the lower portion of the elevating carrier.

As the hay is moved upwardly by the carrier, it is concentrated thereon by the converging compressor bars and also by a pair of converging guide boards 97 which extend over the parallel side bars 12 of the elevator frame. U-straps 98 connected to the inclined side frame bars 12, support the upper ends of the guide boards 97 (see Figs. 2 and 3). The lower ends of these guide boards are fixed to the frame bars 20, being spaced therefrom by the intervening blocks 99.

The supporting springs 94 and 95 for the compressor bars permit the latter to yield as the hay is passed upwardly beneath them. The springs also permit a slight longitudinal movement of the compressor bars as the frame of the gathering cylinder rises and falls and in case the hay bunches beneath the bars. The gathering cylinder, as stated, can rise and fall with its supporting frame and also independently thereof, and thereby accommodate itself to irregularities of the surface of the ground.

It is obvious that changes may be made in the details set forth without departure from the essentials of the invention as defined in the claims.

We claim as our invention:—

1. In a hay loader, the combination of a frame, an axle, ground wheels thereon. means for supporting said frame on said axle at points entirely outside of said wheels, an elevating cylinder mounted on said axle between said wheels, and curved guards interposed between the ends of said cylinder and said wheels and extending in rear of and beneath said axle.

2. In a hay loader, the combination of a frame comprising horizontal side sills and inclined side bars mounted on said sills, ground wheels and a wheel axle supporting said horizontal side sills at points entirely outside of said wheels, the latter being arranged inside of said horizontal side sills, an elevating cylinder on said axle between said wheels, an elevating carrier passing over said cylinder, and cylindrical guards arranged in and substantially filling the spaces between said wheels and the ends of said cylinder.

3. In a hay loader, the combination with ground wheels and a wheel axle, of a frame supported thereby comprising horizontal side sills extending entirely outside of said wheels, an elevating cylinder comprising heads mounted on said axle adjacent said wheels and a series of toothed bars extending between said heads, and curved guards interposed between said heads and said wheels, said guards being arranged substantially in line with the periphery of said heads and extending above, in rear of and beneath said wheel axles.

4. In a hay loader, the combination with ground wheels and a wheel axle, of a frame supported thereby comprising horizontal side sills extending entirely outside of said wheels, an elevating cylinder mounted on said axle between said wheels and cylindrical guards interposed between the ends of said cylinder and said wheels.

5. In a hay loader, the combination with ground wheels and an axle therefor having projecting end portions, of a frame comprising horizontal side sills extending entirely outside of said wheels and inclined side bars mounted on said sills, journal boxes for the projecting ends of said axle fixed to said sills, a cylinder mounted on said axle between said wheels, an elevating carrier passing over said cylinder, supports for said carrier fixed to said inclined side bars, and curved guards interposed in and substantially filling the spaces between the rear portion of said cylinder and said wheels.

6. In a hay loader, the combination with ground wheels and a wheel axle, of horizontal side sills extending entirely outside of said wheels and supported by said wheels and wheel axle, a cylinder having heads mounted on said axle adjacent said wheels, an endless elevating carrier passing over said cylinder, and inclined side bars supporting said carrier arranged entirely in front of the rear portion of said cylinder.

7. In a hay loader, the combination with ground wheels and a wheel axle, of horizontal side sills extending entirely outside of said wheels and supported by said wheels and wheel axle, a cylinder having heads mounted on said axle adjacent said wheels, an endless elevating carrier passing over said cylinder, inclined side bars arranged entirely in front of the rear portion of said cylinder for supporting said carrier, and a cross bar extending between said side sills in front of said wheel axle for supporting the rear ends of said inclined side bars.

8. In a hay loader, the combination with ground wheels and a wheel axle, of horizontal side sills extending entirely outside of said wheels and supported by said wheels and wheel axle, a cylinder having heads mounted on said axle adjacent said wheels, an endless elevating carrier passing over said cylinder, inclined side bars for supporting said carrier arranged in line with the spaces between said cylinder heads and said wheels, and curved guards fixed to the lower ends of said inclined side bars and interposed between said cylinder heads and said wheels.

9. In a hay loader, the combination with ground wheels and a wheel axle, of horizontal side sills extending entirely outside of said wheels and supported by said wheels and wheel axle, a cylinder having heads mounted on said axle adjacent said wheels, an endless elevating carrier passing over said cylinder, inclined side bars for supporting said carrier arranged entirely in front of the rear portion of said cylinder and in line with the spaces between said cylinder heads and said wheels, a cross bar extending between said sills in front of said wheels for supporting said inclined side bars, and cylindrical guards fixed to the lower ends of said inclined side bars and interposed between said cylindrical heads and said wheels.

10. In a hay loader, the combination with ground wheels and an axle therefor, of horizontal side sills extending entirely outside of said wheels and supported on said wheel axle, an elevating cylinder having heads mounted on said axle adjacent said wheels, a floating frame pivotally mounted on the rear ends of said sills, a gathering cylinder mounted thereon and geared to said wheel axle, frame bars extending upwardly from said sills, means thereon for supporting and adjusting said floating frame, an endless carrier passing over said elevating cylinder, inclined side bars for supporting said carrier, and a cross bar extending between said side sills in front of said wheels for supporting the rear ends of said inclined side bars.

11. In a hay loader, the combination with ground wheels and a wheel axle, of a frame supported thereby comprising horizontal side sills extending entirely outside of said wheels and inclined bars arranged in front of said wheel axle, an elevating cylinder having heads mounted on said axle adjacent said wheels, an endless carrier passing over said cylinder and supported by said inclined side bars, and cylindrical guards interposed in the spaces between the heads of said cylinder and said wheels, said cylindrical guards being smaller than said cylinder.

12. In a hay loader, the combination with ground wheels and a wheel axle, of a frame supported thereby comprising horizontal side sills extending entirely outside of said wheels and inclined bars arranged in front of said wheel axle, an elevating cylinder having heads mounted on said axle adjacent said wheels, an endless carrier passing over said cylinder and supported by said inclined side bars, and cylindrical guards interposed in the spaces between the heads of said cylinder and said wheels, said cylinder heads having laterally projecting flanges overlapping the inner ends of said cylindrical guards.

13. In a hay loader, the combination with supporting wheels and a wheel axle, of a main frame supported thereby comprising horizontal side sills mounted on said wheel axle, and inclined side bars rigidly connected to said sills, an elevating cylinder mounted on said wheel axle, an endless carrier extending over said cylinder and mounted on said inclined side bars, a floating frame comprising rigidly connected side bars pivoted at their forward ends to said side sills, flexible connections for adjustably supporting said floating frame, vertical supporting guides fixed to the side bars of said floating frame, bearings independently and vertically movable in said guides, a shaft journaled in said bearings and geared to said wheel axle, and a gathering cylinder fixed to said shaft.

14. In a hay loader, the combination with a main frame, supporting wheels therefor and an elevating carrier mounted thereon, of a floating frame pivotally mounted on the rear of said main frame, flexible connections for adjustably supporting said floating frame, vertical supporting guides at the sides of said floating frame, bearings movably mounted in said guides, a shaft journaled in said bearings and geared to said wheel axle, and a gathering cylinder mounted on said shaft.

15. In a hay loader, the combination with a main frame, supporting wheels therefor and an elevating carrier mounted thereon, of a floating frame connected to said main frame in rear of said carrier, supporting guides at the sides of said floating frame, bearings vertically movable in said guides, a rotatable shaft journaled in said bearings and geared to said wheel axle, a gathering cylinder fixed to said shaft, said cylinder having a series of toothed rock bars, and a member fixed to one of said vertically movable bearings for adjusting said rock shafts as said cylinder rotates.

16. In a hay loader, the combination of an elevating cylinder, an endless carrier comprising connected cross slats passing over said cylinder and transverse rows of rigid, hay-engaging and elevating teeth fixed on said cylinder and adapted to project through said carrier behind said cross slats, said rigid teeth being rearwardly inclined and arranged to be maintained closely adjacent said cross slats as they are withdrawn from the hay, whereby said slats act as strippers for said teeth.

17. In a hay loader, the combination of an elevating cylinder, an endless carrier comprising connected cross slats passing over said cylinder, the latter having means for engaging and driving said carrier, and transverse rows of rigid, hay-engaging and elevating teeth fixed on said cylinder and arranged to project through said carrier behind said cross slats, said fixed rigid teeth being rearwardly curved and adapted to be maintained closely adjacent said cross slats as said teeth are withdrawn from the hay, whereby said slats act as strippers for said teeth.

18. In a hay loader, the combination of an elevating cylinder comprising heads and a circular series of transverse bars fixed to said heads, an endless carrier comprising connected cross slats passing over said cylinder, said cylinder heads having notches substantially in alinement with said transverse bars for engaging said cross slats to drive said carrier and rows of rigid, rearwardly curved teeth fixed on the transverse bars of said cylinder for engaging and elevating the hay, said teeth being arranged to project through said carrier behind and closely adjacent said cross slats, whereby the latter act as strippers for said teeth.

19. In a hay loader, the combination with a frame, of an endless elevating carrier comprising connected cross slats, an elevating cylinder over which said carrier passes, a series of runner bars on the frame for guiding the upper reach of said carrier, and curved guides for said carrier slats extending from the lower ends of said runner bars over said cylinder.

20. In a hay loader, the combination with a frame, of an endless elevating carrier comprising connected cross slats, an elevating cylinder over which said carrier passes, a series of runner bars on the frame for guiding the upper reach of said carrier, and guiding loops for said carrier slats fixed to the lower ends of said runner bars and extending about said cylinder.

21. In a hay loader, the combination with a frame, of an endless elevating carrier comprising connected cross slats, an elevating cylinder over which said carrier passes, a series of runner bars on the frame for guiding the upper reach of said carrier and curved straps extending from the lower ends of said runner bars for supporting and guiding said carrier slats as the latter pass from said cylinder onto said runner bars, said cylinder having rows of rearwardly curved teeth arranged to project through said carrier behind and closely adjacent said carrier slats.

HENRY F. RODEMEYER.
CECIL R. MARTIN.

Copies of this patent may be obtained for five cents each, by addressing the "Commissioner of Patents, Washington, D. C."